US012570486B2

(12) United States Patent
Yoshida

(10) Patent No.: US 12,570,486 B2
(45) Date of Patent: Mar. 10, 2026

(54) MOLDED PART, MOLDED PART SUPPORTING STRUCTURE, AND MOLDED PART CONVEYANCE METHOD

(71) Applicant: CANON KABUSHIKI KAISHA, Tokyo (JP)

(72) Inventor: Masato Yoshida, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 292 days.

(21) Appl. No.: 18/518,213

(22) Filed: Nov. 22, 2023

(65) Prior Publication Data

US 2024/0174461 A1     May 30, 2024

(30) Foreign Application Priority Data

Nov. 28, 2022    (JP) .................................. 2022-188932

(51) Int. Cl.
 *B65G 57/00*        (2006.01)
 *B23Q 5/22*         (2006.01)
 *B65D 19/44*        (2006.01)

(52) U.S. Cl.
 CPC ............. *B65G 57/005* (2013.01); *B23Q 5/22* (2013.01); *B65D 19/44* (2013.01)

(58) Field of Classification Search
 CPC ........ B29C 45/14; B29C 45/27; B65G 57/005
 See application file for complete search history.

(56) References Cited

FOREIGN PATENT DOCUMENTS

| JP | S5887029 A | 5/1983 |
| JP | H09122593 A | 5/1997 |
| JP | 2001277301 A | 10/2001 |
| JP | 2006320956 A | 11/2006 |
| JP | 2015158210 A | 9/2015 |

*Primary Examiner* — James Sanders
(74) *Attorney, Agent, or Firm* — Canon U.S.A., Inc. IP Division

(57)                ABSTRACT

A stackable molded part includes a runner portion that connects a plurality of parts, and a positioning portion that is formed on the runner portion, wherein the positioning portion protrudes in a shape of a column from the runner portion to at least one side in a stacking direction in which molded parts are stacked, wherein an end portion of the positioning portion of the molded part is engageable with an end portion of a positioning portion of another molded part that adjoins the molded part when these molded parts are stacked on top of each other, and wherein the positioning portion protrudes more than the plurality of parts in the stacking direction to the one side of the positioning portion.

11 Claims, 5 Drawing Sheets

MOLDED PART, MOLDED PART SUPPORTING STRUCTURE, AND MOLDED PART CONVEYANCE METHOD

BACKGROUND

Field of the Disclosure

The present disclosure relates to a molded part, a molded part supporting structure, and a molded part conveyance method.

Description of the Related Art

As a part supply method for automated assembly equipment in a cell production system, there is a method in which a plurality of molded parts are stacked on top of each other, placed on a tray, and supplied to a single robot. Each of the molded parts includes a plurality of kinds of parts to be assembled, which are connected together by a runner portion to form a bundle of parts. In this method, for example, the robot needs to grasp a part and remove the part from a molded part. Therefore, the target part needs to be positioned at a predetermined location with respect to the robot. Japanese Patent Application Laid-Open No. 2001-277301 discusses a technique in which positioning portions are formed at a runner-like connection portion that connects a plurality of parts. These positioning portions are each formed in a cylindrical shape having a small-diameter part and a large-diameter part, and are each formed to protrude upward from the connection portion. In this way, a plurality of molded parts can be stacked on top of each other via the positioning portions, and positioning with respect to a processing fixture such as a robot can be achieved.

In the technique discussed in Japanese Patent Application Laid-Open No. 2001-277301, the positioning portions are formed upward at the connection portion, and for this reason, if larger parts are used, the height of the individual positioning portion needs to be increased accordingly. Thus, for example, when a robot performs an operation of grasping a part, the positioning portions could interfere with the operation. When a molded part is placed on a flat surface, the molded part could not take a stable posture, and as a result, the positioning performance with respect to the installation surface could deteriorate.

SUMMARY

Some embodiments of the present disclosure are directed to providing a molded part, a molded part supporting structure, and a molded part conveyance method that improve the positioning performance while preventing interference with a robot at a secondary process.

According to an aspect of the present disclosure, a stackable molded part includes a runner portion that connects a plurality of parts, and a positioning portion that is formed on the runner portion, wherein the positioning portion protrudes in a shape of a column from the runner portion to at least one side in a stacking direction in which molded parts are stacked, wherein an end portion of the positioning portion of the molded part is engageable with an end portion of a positioning portion of another molded part that adjoins the molded part when these molded parts are stacked on top of each other, and wherein the positioning portion protrudes more than the plurality of parts in the stacking direction to the one side of the positioning portion.

According to another aspect of the present disclosure, a molded part supporting structure includes the stackable molded part and a supporting fixture, wherein the supporting fixture includes a top surface and a hole portion which is formed in the top surface and into which the positioning portion of the molded part is insertable.

According to yet another aspect of the present disclosure, a molded part conveyance method for conveying the stackable molded part that is stacked on a supporting fixture includes inserting the positioning portion of the molded part into a hole portion formed in a top surface of the supporting fixture, and stacking the molded part on the supporting fixture.

Further features of various embodiments will become apparent from the following description of exemplary embodiments with reference to the attached drawings.

DESCRIPTION OF THE EMBODIMENTS

Exemplary embodiments according to the present disclosure will be described with reference to the accompanying drawings. For example, the sizes, materials, and shapes of the components according to the exemplary embodiments and the relative arrangements of these components may be modified as needed, depending on the construction of the individual molded part according to the present disclosure or on various kinds of conditions, and do not limit the scope of the present disclosure.

Figure 1A:
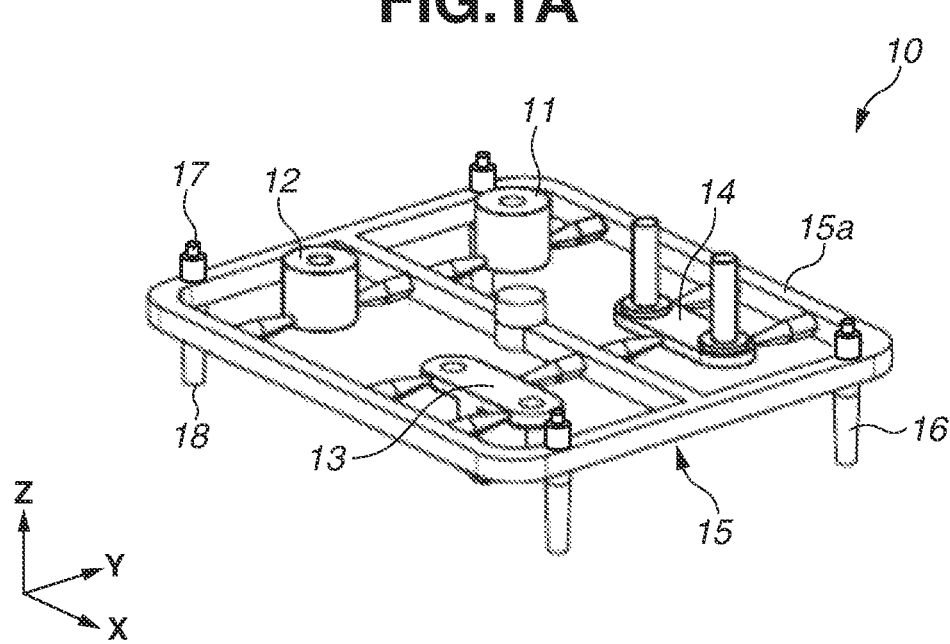
FIG. 1A is a perspective view of a molded part according to a first exemplary embodiment.
Figure 1B:
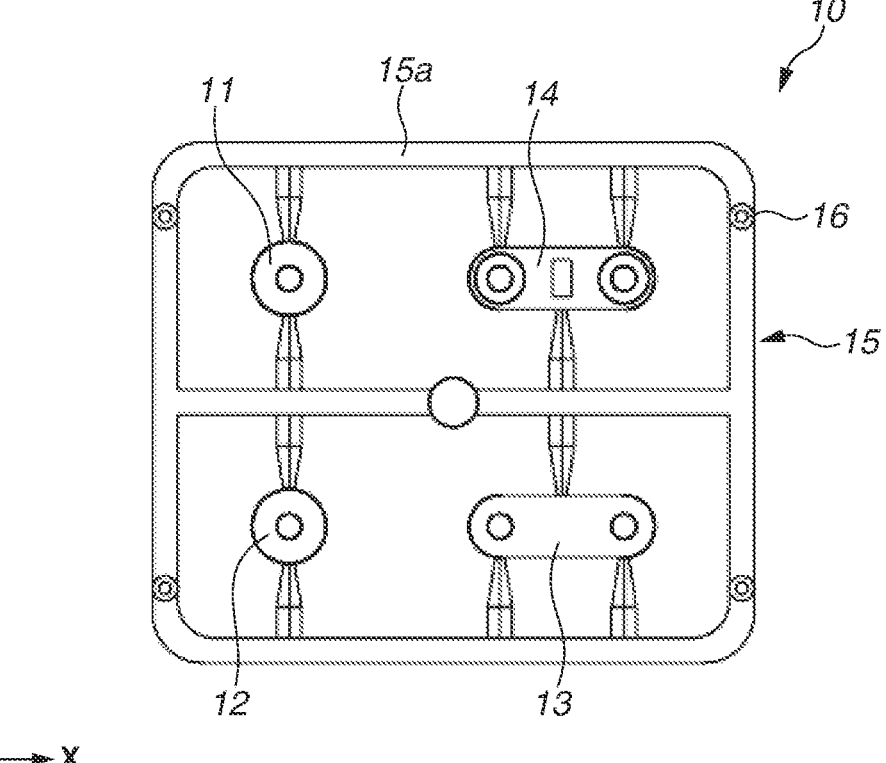
FIG. 1B is a plan view of the molded part according to the first exemplary embodiment.
Figure 1B:
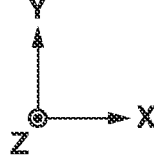

A construction of a molded part according to a first exemplary embodiment of the present disclosure will be described with reference to FIGS. 1A and 1B. FIGS. 1A and 1B are a perspective view and a plan view of a molded part according to the present exemplary embodiment, respectively.

A molded part 10 is a plastic injection-molded article and includes different kinds of parts 11 to 14 and a runner portion 15 that connects the plurality of parts 11 to 14. The plurality of parts 11 to 14 are removed from the runner portion 15 and are assembled into a predetermined unit. When molded by a mold (not illustrated), the runner portion 15 is formed to match a runner of the mold. The runner portion 15 holds the posture of each of the parts 11 to 14. The runner portion 15 has a rectangular outer frame portion 15a that surrounds the plurality of parts 11 to 14. As illustrated in FIGS. 1A and 1B, the following description is based on the assumption that longitudinal sides of the outer frame portion 15a extend along the X direction, transverse sides of the outer frame portion 15a extend along the Y direction, and sides perpendicular to these directions extend along the Z direction.

The individual molded part 10 has a plurality of positioning portions 16 on the runner portion 15. The individual positioning portion 16 protrudes in the shape of a column to both sides in the Z direction from the outer frame portion 15a of the runner portion 15. An end portion of a positioning portion 16 of one molded part 10 is constructed to engage with an end portion of a positioning portion 16 of another molded part 10. Specifically, the individual positioning portion 16 has a convex portion 17 at its upper end and a concave portion 18 at its lower end. The convex portion 17 and the concave portion 18 of a positioning portion 16 of one molded part 10 are constructed to engage with the concave portion 18 and convex portion 17 of a positioning portion 16 of another molded part 10, respectively. With these positioning portions 16, a plurality of molded parts 10 can be stacked on top of each other as will be described below.

Figure 2:
FIG. 2 illustrates molded parts according to the first exemplary embodiment that are to be stacked on top of each other on a tray.
Figure 3A:
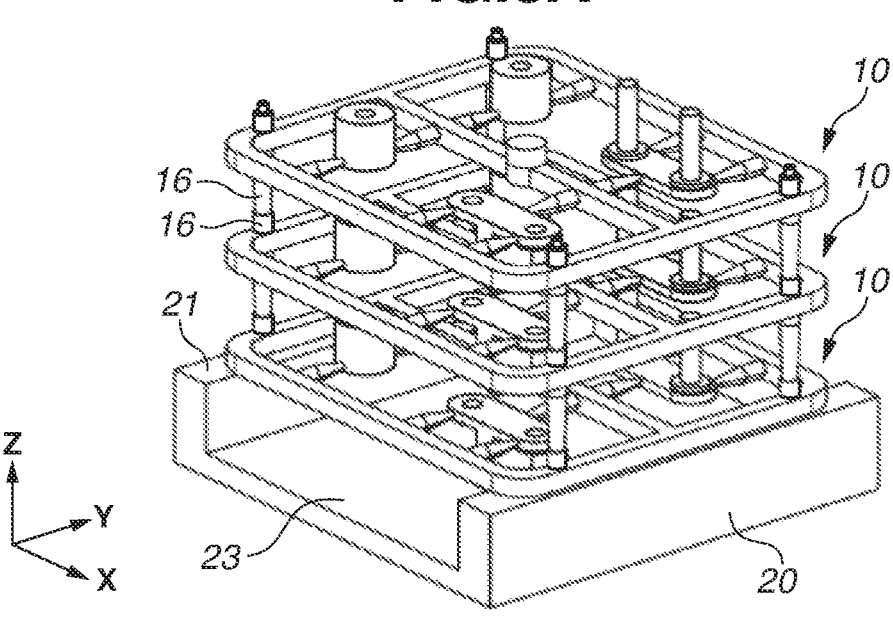
FIG. 3A is a perspective view of the molded parts according to the first exemplary embodiment that have been stacked on top of each other and that have been placed on the tray.
Figure 3B:
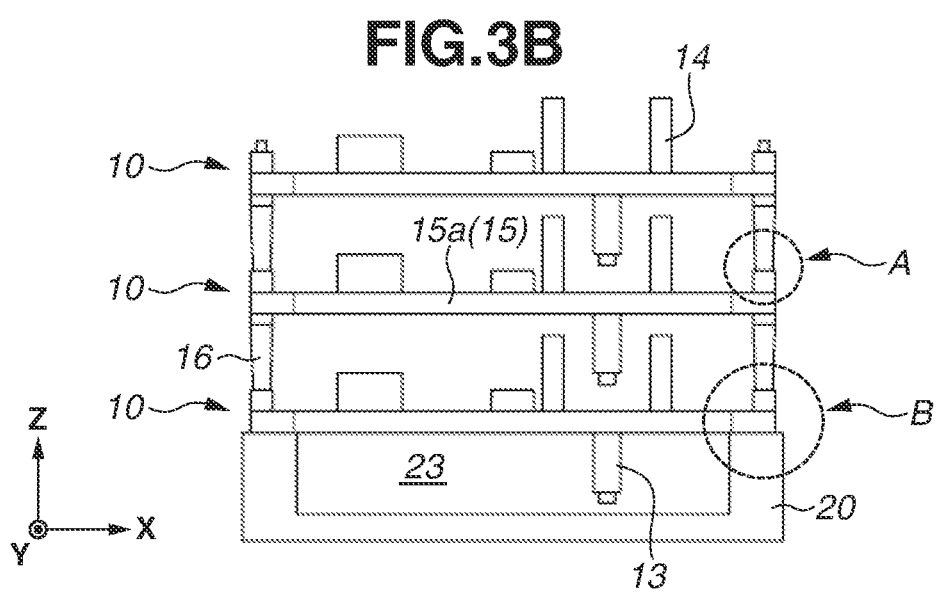
FIG. 3B is a plan view of the molded parts according to the first exemplary embodiment that have been stacked on top of each other and that have been placed on the tray.
Figure 3C:
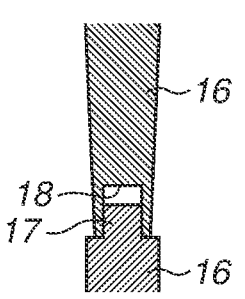
FIG. 3C is an enlarged view of an area inside a circle A in FIG. 3B.
Figure 3D:
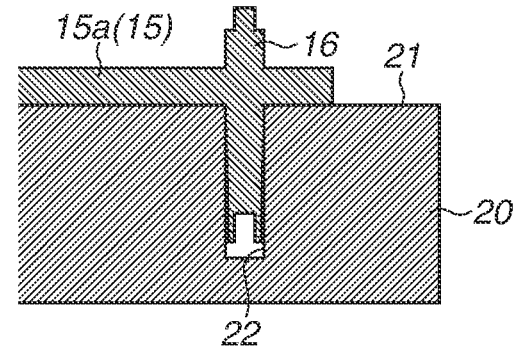
FIG. 3D is an enlarged view of an area inside a circle B in FIG. 3B.

A supporting structure on which molded parts according to the present exemplary embodiment are stacked and supported will be described with reference to FIG. 2 and FIGS. 3A to 3D. FIG. 2 is a perspective view of molded parts according to the present exemplary embodiment that are to be stacked on top of each other and to be placed on a tray. FIGS. 3A and 3B are a perspective view and a side view of the molded parts according to the present exemplary embodiment that have been stacked on top of each other and that have been placed on the tray. FIG. 3C is an enlarged sectional view of an area inside a circle A in FIG. 3B, and FIG. 3D is an enlarged sectional view of an area inside a circle B in FIG. 3B.

When the plurality of molded parts 10 are stacked on top of each other, end portions of the positioning portions 16 of two vertically adjoining molded parts 10, that is, the convex portions 17 of the lower positioning portions 16 and the concave portions 18 of the upper positioning portions 16, are engaged with each other. The plurality of molded parts 10 can be vertically stacked on top of each other while positioned with respect to each other. As described above, the positioning portions 16 protrude vertically from the runner portion 15 (to the two sides in the Z direction). Thus, for example, even when the individual molded part 10 has the part 13 protruding downward and the part 14 protruding upward, it is possible to prevent these parts from interfering with each other by suitably adjusting the protrusion length of the positioning portions 16. In some embodiments the length of the downward protrusion of the individual positioning portion 16 is greater than the length of the part 13, which protrudes downward most. In this way, the molded part 10 can stand by itself.

The plurality of molded parts 10 stacked on top of each other can be simultaneously conveyed by moving the lowest molded part 10. In this case, in some embodiments the plurality of molded parts 10 are stacked and conveyed on a conveyance fixture (supporting fixture), such as a tray 20. The tray 20 has top surfaces 21 and a plurality of hole portions 22, which are formed in the top surfaces 21 and into which the plurality of positioning portions 16 of a molded part 10 can be inserted. Thus, by inserting the positioning portions 16 of a molded part 10 into the hole portions 22 and engaging these positioning portions 16 with the hole portions 22, it is possible to convey the plurality of molded parts 10 stacked on top of each other and positioned with respect to the tray 20. The top surfaces 21 of the tray 20 are provided with a back clearance 23, which is a largely concaved portion. In this way, when a molded part 10 is placed on the tray 20 by inserting the positioning portions 16 into the hole portions 22, for example, even if the molded part 10 has the part 13 protruding downward and the part 14 protruding upward, it is possible to prevent these parts from interfering with the tray 20.

When the positioning portions 16 and the hole portions 22 are engaged with each other, the positioning portions 16 do not always need to be completely inserted into the hole portions 22. However, in some embodiments the positioning portions 16 and the hole portions 22 are engaged with each other by inserting the positioning portions 16 into the hole portions 22 up to the root portions of the positioning portions 16 (up to the root portions of the portions protruding downward from the outer frame portion 15a). In this way, the root portions of the positioning portions 16 of the molded part 10 engage with their respective hole portions 22, and the runner portion 15 (the outer frame portion 15a) is stacked on the top surfaces 21. As a result, the molded part 10 is positioned with respect to the tray 20. That is, the molded part 10 is positioned by the root portion of the individual positioning portion 16 along the XY directions and is positioned by the bottom surface of the runner portion 15 (the outer frame portion 15a) along the Z direction. Thus, even when the individual positioning portion 16 has draft, which is characteristic to molded articles, the molded part 10 can be accurately positioned with respect to the tray 20 (for example, with an accuracy of 0.1 mm or less). Because a wide area of the molded part 10 is in contact with the tray 20, the stability achieved when the molded part 10 is positioned or conveyed can be significantly improved.

Figure 4A:
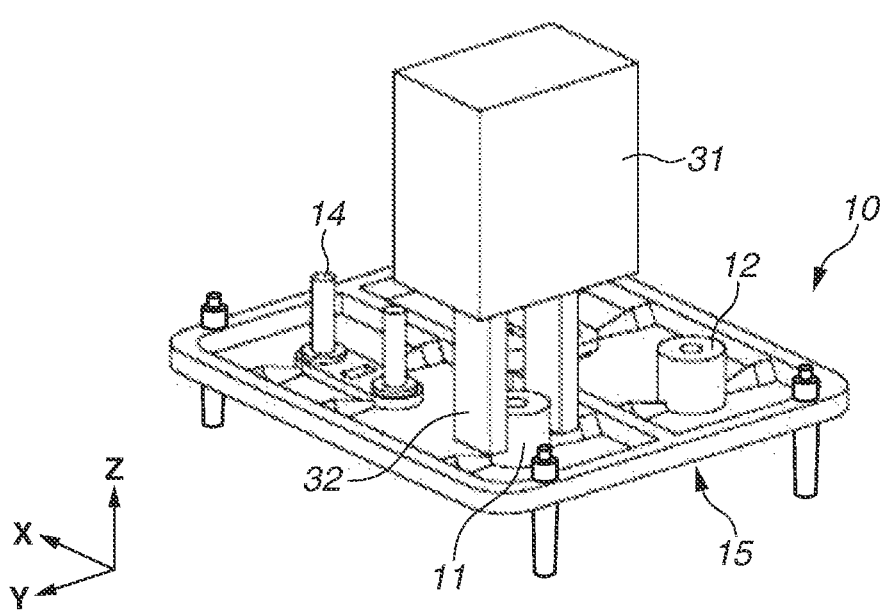
FIGS. 4A and 4B are each a perspective view illustrating the removal of a part of a molded part according to the first exemplary embodiment.
Figure 4B:
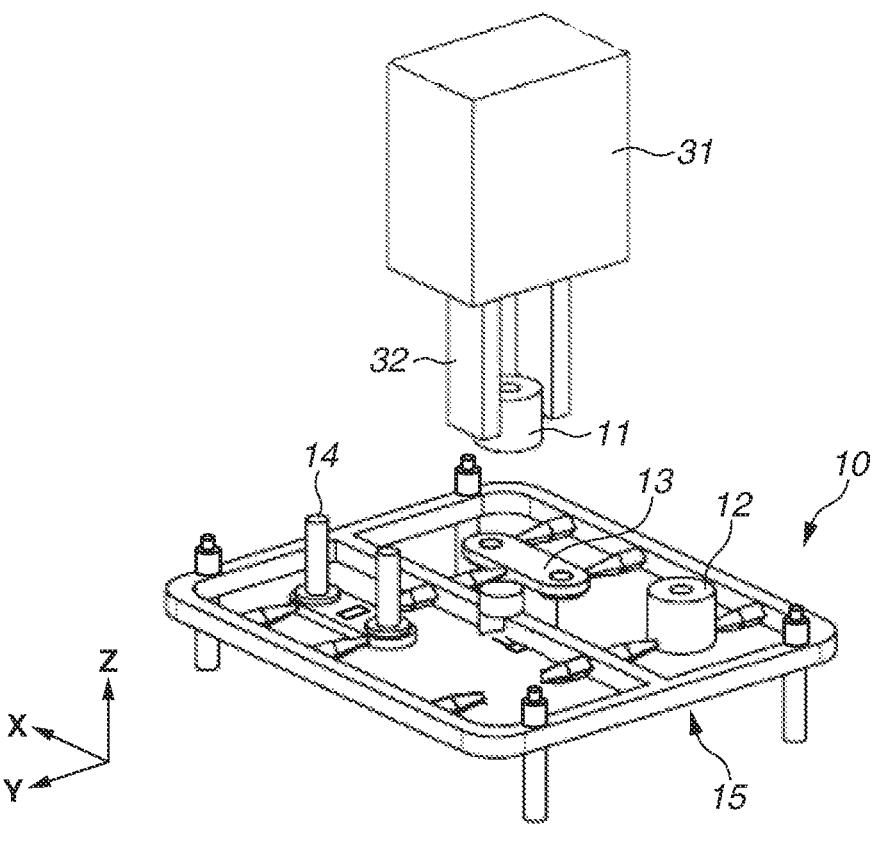

FIGS. 4A and 4B are each a perspective view illustrating the removal of a part of a molded part according to the present exemplary embodiment.

The parts 11 to 14 are to be removed from the molded part 10 as follows. First, the molded part 10 is positioned and supported by a pressing mechanism (not illustrated). Next, fingers 32 of a robot 31 grasp the part 11 and raise the part 11 upward, and as a result, the part 11 is removed from the runner portion 15. The robot 31 sets the removed part 11 on an assembly fixture (not illustrated). Next, in the same procedure, the fingers 32 sequentially remove the remaining parts 12 to 14 from the molded part 10, and the robot 31 sets the removed remaining parts 12 to 14 on the assembly fixture. After the parts 11 to 14, removed as described above, are assembled into a predetermined unit by the assembly fixture, the predetermined unit is conveyed to another process. Next, the predetermined unit is combined with other parts and is finally assembled as a product. The robot 31 to be used is not limited to any particular robot. Examples of the robot 31 include a cartesian robot that uses linear motions in combination, a scala robot, and a 6-axis vertical articulated robot. Although FIGS. 4A and 4B illustrate two claws as the fingers 32 of the robot 31, three claws may be used as the fingers 32.

According to the present exemplary embodiment, a plurality of molded parts 10 can be stacked on top of each other via their positioning portions 16 and the accuracy of the positioning with respect to the tray 20 can be improved, that is, the conveyance accuracy can be improved when the plurality of molded parts 10 is placed and conveyed on the tray 20. The positioning portions 16 protrude from the runner portion 15 not only upward but also downward. Thus, even when the size of any of the parts 11 to 14 is large, the operation of the robot 31 grasping the parts 11 to 14 will not be greatly interrupted by suitably adjusting the length of the protrusion. The molded part 10 can stand by itself in a case where the positioning portions 16 are formed to protrude downward more than the part 13 protruding downward most among the plurality of parts 11 to 14. That is, the molded part 10 can be placed on a predetermined flat surface (flat placement) without bringing the plurality of parts 11 to 14 in contact with the flat surface.

The positioning performance of the parts 11 to 14 of the molded part 10 with respect to the installation surface does not deteriorate. In addition, the parts 11 to 14 are not damaged because the parts 11 to 14 do not come in contact with the placement surface.

In order to prevent the interference with the robot 31, in some embodiments the positioning portions 16 do not protrude upward more than the part 14 protruding upward most among the plurality of parts 11 to 14. To describe in an extreme manner, the positioning portions 16 may be formed to protrude from the runner portion 15 only downward. However, if the positioning portions 16 are formed to protrude only downward, the positioning portions 16 need to be protruded downward more. Otherwise, when a plurality of molded parts 10 are stacked on top of each other, the interference between vertically adjoining sets of parts 11 to 14 cannot be prevented in the same way as described above. That is, when the positioning portions 16 protrude only downward, the vertical length of the molded part 10 becomes greater than that when the positioning portions 16 protrude both upward and downward. In this case, when molding is performed, the thickness of the mold is increased and the mold opening stroke is extended, possibly resulting in more production costs. As illustrated in the drawings, in some embodiments the positioning portions 16 protrude from the runner portion 15 not only downward (one direction) but also upward (the other direction).

Although the number of positioning portions 16 is not limited to any particular number, in some embodiments the number of positioning portions 16 is three or more. The individual positioning portion 16 may be located on the runner portion 15 between two of the parts 11 to 14. However, to improve the positioning accuracy of the parts 11 to 14, in some embodiments the individual positioning portion 16 is located on the outer side of the molded part 10 as much as possible, that is, on the outer frame portion 15a of the runner portion 15. The shape of the individual convex portion 17 is not limited to a columnar shape as illustrated in the drawings. In addition, the shape of the individual concave portion 18 is not limited to a cylindrical shape. In view of the moldability, however, in some embodiments the individual convex portion 17 has a cylindrical shape and the individual concave portion 18 also has a cylindrical shape. In some embodiments the central axis of the convex portion 17 and the central axis of the concave portion 18 match the central axis of the positioning portion 16. In this way, the positioning accuracy of the vertically adjoining molded parts 10 can be improved.

In the illustrated examples, the convex portion (second engaging portion) 17 is formed at the upper end (end portion in the other direction) of the individual positioning portion 16, and the concave portion (first engaging portion) 18 is formed at the lower end (end portion in one direction) of the individual positioning portion 16. However, the locations of the convex portion 17 and the concave portion 18 may be reversed. That is, the convex portion 17 may be formed as the first engaging portion at the lower end of the positioning portion 16, and the concave portion 18 may be formed as the second engaging portion at the upper end of the positioning portion 16. In view of the stability for allowing the molded part 10 to stand by itself, however, in some embodiments the convex portion 17 is formed at the upper end of the positioning portion 16 and the concave portion 18 is formed at the lower end of the positioning portion 16, as illustrated in the drawings.

Figure 5A:
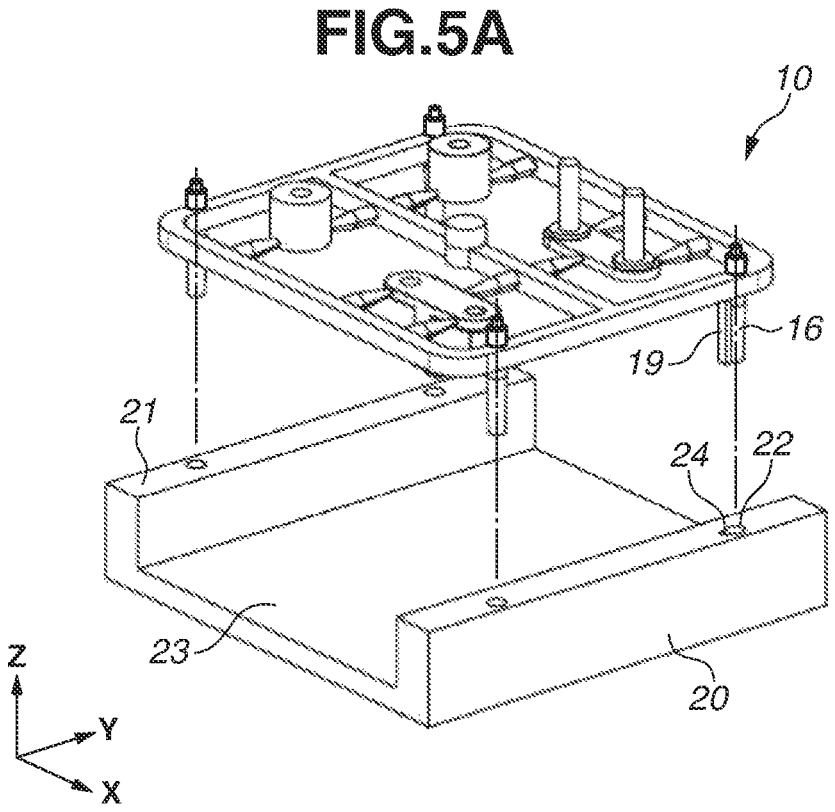
FIG. 5A is a perspective view illustrating a molded part according to a second exemplary embodiment that is to be stacked on a tray.
Figure 5B:
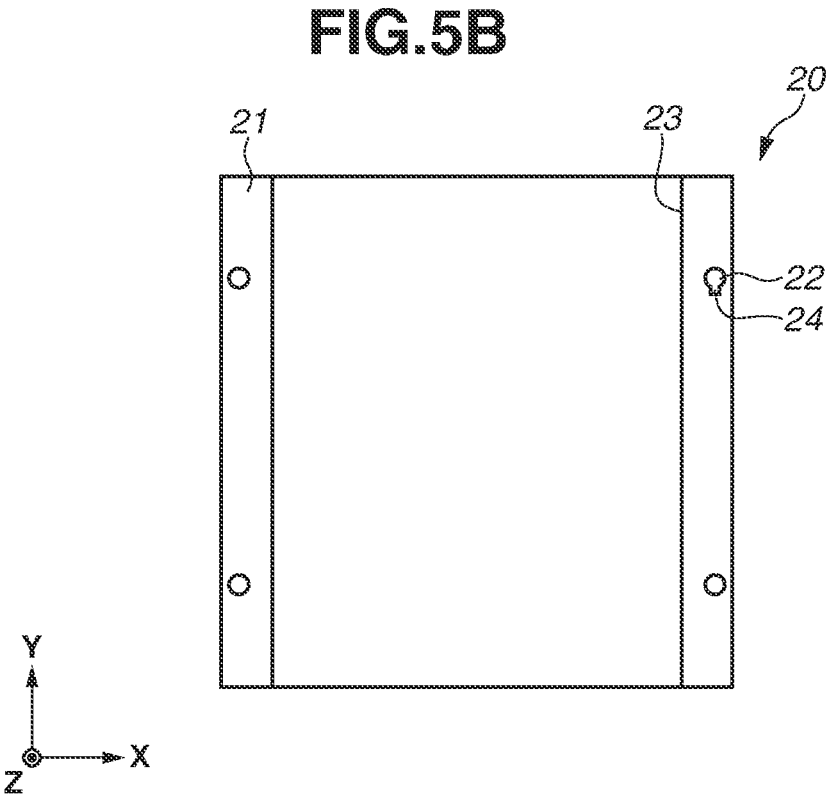
FIG. 5B is a plan view of the tray according to the second exemplary embodiment.

FIG. 5A is a perspective view illustrating a molded part according to a second exemplary embodiment of the present disclosure that is to be stacked on a tray, and FIG. 5B is a plan view of the tray according to the present exemplary embodiment.

According to the present exemplary embodiment, an engaging protrusion (a third engaging portion) 19 is formed on the outer periphery of a positioning portion 16 of a molded part 10. This engaging protrusion 19 extends along the axis of the positioning portion 16. In addition, an engaging groove (a fourth engaging portion) 24, which is for the engaging protrusion 19, is formed on the inner periphery of a hole portion 22 of a tray 20. The engaging protrusion 19 can engage with the engaging groove 24. In this way, the molded part 10 can be prevented from being placed on the tray 20 in an erroneous posture. The number of engaging protrusions 19 and the number of engaging grooves 24 are not limited to any particular number. For example, while an engaging protrusion 19 may be formed on each of the two or more positioning portions 16 and an engaging groove 24 may be formed on each of the two or more hole portions 22, it is sufficient that only one engaging protrusion 19 be formed on one positioning portion 16 and only one engaging groove 24 be formed on one hole portion 22.

Other constructions and advantageous effects according to the present exemplary embodiment are the same as those according to the first exemplary embodiment.

The disclosure of the present exemplary embodiments includes, but is not limited to, the following constructions.

(Construction 1)

A stackable molded part comprising:

a runner portion that connects a plurality of parts; and a positioning portion that is formed on the runner portion, wherein the positioning portion protrudes in a shape of a column from the runner portion to at least one side in a stacking direction in which molded parts are stacked, wherein an end portion of the positioning portion of the molded part is engageable with an end portion of a positioning portion of another molded part that adjoins the molded part when these molded parts are stacked on top of each other, and wherein the positioning portion protrudes more than the plurality of parts in the stacking direction to the one side of the positioning portion.

(Construction 2)

The molded part according to construction 1, wherein the positioning portion protrudes from the runner portion to both sides in the stacking direction of the molded part, and wherein any one of the plurality of parts protrudes more than the positioning portion in the stacking direction.

(Construction 3)

The molded part according to construction 2, wherein the positioning portion has a first engaging portion that is formed on an end portion located on the one side and a second engaging portion that is formed on an end portion located on the other side and that is engageable with the first engaging portion of the positioning portion of the adjoining molded part.

(Construction 4)

The molded part according to construction 3, wherein the first engaging portion is a cylindrical concave portion, and the second engaging portion is a columnar convex portion.

(Construction 5)

The molded part according to construction 4, wherein the central axis of the convex portion and the central axis of the concave portion match the central axis of the positioning portion.

(Construction 6)

The molded part according to any one of constructions 1 to 5, wherein the runner portion has an outer frame portion that surrounds the plurality of parts, and the positioning portion is formed on the outer frame portion.

(Construction 7)

A molded part supporting structure comprising:

the molded part according to any one of constructions 1 to 6; and a supporting fixture on which the molded part is stacked and supported, wherein the supporting fixture includes a top surface and a hole portion which is formed in the top surface and into which the positioning portion of the molded part is insertable.

(Construction 8)

The molded part supporting structure according to construction 7, wherein, when the positioning portion is inserted into the hole portion, a root portion of the positioning portion that protrudes from the runner portion engages with the hole portion, and the molded part is consequently positioned with respect to the supporting fixture.

(Construction 9)

The molded part supporting structure according to construction 8, wherein the runner portion is stacked on the top surface, and the molded part is consequently positioned with respect to the supporting fixture.

(Construction 10)

The molded part supporting structure according to any one of constructions 7 to 9, wherein an engaging target portion engageable with an engaging portion that is formed on an outer periphery of the positioning portion is formed on an inner periphery of the hole portion.

(Construction 11)

The molded part supporting structure according to any one of constructions 7 to 10, wherein the top surface is provided with a back clearance so that the supporting fixture does not interfere with the plurality of parts when the positioning portion is inserted into the hole portion.

(Construction 12)

A molded part conveyance method for conveying the molded part according to any one of constructions 1 to 6 that is stacked on a supporting fixture, the molded part conveyance method comprising:

inserting the positioning portion of the molded part into a hole portion formed in a top surface of the supporting fixture; and stacking the molded part on the supporting fixture.

While the present disclosure has described exemplary embodiments, it is to be understood that some embodiments are not limited to the disclosed exemplary embodiments. The scope of the following claims is to be accorded the broadest interpretation so as to encompass all such modifications and equivalent structures and functions.

This application claims priority to Japanese Patent Application No. 2022-188932, which was filed on Nov. 28, 2022 and which is hereby incorporated by reference herein in its entirety.

What is claimed is:

1. A stackable molded part comprising:

a runner portion that connects a plurality of parts; and a positioning portion that is formed on the runner portion, wherein the positioning portion protrudes in a shape of a column from the runner portion to at least one side in a stacking direction in which molded parts are stacked, wherein an end portion of the positioning portion of the molded part is engageable with an end portion of a positioning portion of another molded part that adjoins the molded part when these molded parts are stacked on top of each other, wherein the positioning portion protrudes more than the plurality of parts in the stacking direction to the one side of the positioning portion, wherein a first engaging portion is formed on an outer periphery of the positioning portion, and wherein the first engaging portion is engageable with a second engaging portion that is formed on an inner periphery of a hole portion into which the positioning portion of the molded part is insertable, wherein the hole portion is formed in a top surface of a supporting fixture on which the molded part can be stacked and supported.

2. The stackable molded part according to claim 1, wherein the positioning portion protrudes from the runner portion to both sides in the stacking direction of the molded part, and wherein any one of the plurality of parts protrudes more than the positioning portion in the stacking direction.

3. The stackable molded part according to claim 2, wherein the positioning portion has a third engaging portion that is formed on an end portion located on the one side and a fourth engaging portion that is formed on an end portion located on the other side and that is engageable with the third engaging portion of the positioning portion of the adjoining molded part.

4. The stackable molded part according to claim 3, wherein the third engaging portion is a cylindrical concave portion, and the fourth engaging portion is a columnar convex portion.

5. The stackable molded part according to claim 4, wherein a central axis of the columnar convex portion and a central axis of the cylindrical concave portion match the central axis of the positioning portion.

6. The stackable molded part according to claim 1, wherein the runner portion has an outer frame portion that surrounds the plurality of parts, and the positioning portion is formed on the outer frame portion.

7. A molded part supporting structure comprising:

a stackable molded part including a runner portion that connects a plurality of parts and a positioning portion that is formed on the runner portion, wherein the positioning portion protrudes in a shape of a column from the runner portion to at least one side in a stacking direction in which molded parts are stacked, wherein an end portion of the positioning portion of the molded part is engageable with an end portion of a positioning portion of another molded part that adjoins the molded part when these molded parts are stacked on top of each other, and wherein the positioning portion protrudes more than the plurality of parts in the stacking direction to the one side of the positioning portion; and a supporting fixture on which the molded part is stacked and supported, wherein the supporting fixture includes a top surface and a hole portion which is formed in the top surface and into which the positioning portion of the molded part is insertable, wherein a first engaging portion is formed on an outer periphery of the positioning portion, and wherein a second engaging portion engageable with the first engaging portion is formed on an inner periphery of the hole portion.

8. The molded part supporting structure according to claim 7, wherein, when the positioning portion is inserted into the hole portion, a root portion of the positioning portion that protrudes from the runner portion engages with the hole portion, and the molded part is consequently positioned with respect to the supporting fixture.

9. The molded part supporting structure according to claim 8, wherein the runner portion is stacked on the top surface, and the molded part is consequently positioned with respect to the supporting fixture.

10. The molded part supporting structure according to claim 7, wherein the top surface is provided with a back clearance so that the supporting fixture does not interfere with the plurality of parts when the positioning portion is inserted into the hole portion.

11. A molded part conveyance method for conveying a stackable molded part that is stacked on a supporting fixture, the molded part including a runner portion that connects a plurality of parts and a positioning portion that is formed on the runner portion, wherein the positioning portion protrudes in a shape of a column from the runner portion to at least one side in a stacking direction in which molded parts are stacked, wherein an end portion of the positioning portion of the molded part is engageable with an end portion of a positioning portion of another molded part that adjoins the molded part when these molded parts are stacked on top of each other, wherein the positioning portion protrudes more than the plurality of parts in the stacking direction to the one side of the positioning portion, wherein a first engaging portion is formed on an outer periphery of the positioning portion, and wherein a second engaging portion engageable with the first engaging portion is formed on an inner periphery of a hole portion into which the positioning portion of the molded part is insertable, wherein the hole portion is formed in a top surface of the supporting fixture on which the molded part can be stacked and supported, the molded part conveyance method comprising:

inserting the positioning portion of the molded part into the hole portion formed in the top surface of the supporting fixture; and stacking the molded part on the supporting fixture.

* * * * *